A. H. ADAMS.
PEDAL ATTACHMENT.
APPLICATION FILED JUNE 30, 1913.

1,096,339.

Patented May 12, 1914.

WITNESSES:
H. J. Frost.
M. LeConte.

INVENTOR.
A. H. ADAMS
BY Miller & White
ATTORNEYS.

UNITED STATES PATENT OFFICE.

ARCHIBALD H. ADAMS, OF SAN FRANCISCO, CALIFORNIA.

PEDAL ATTACHMENT.

1,096,339. Specification of Letters Patent. Patented May 12, 1914.

Application filed June 30, 1913. Serial No. 776,601.

*To all whom it may concern:*

Be it known that I, ARCHIBALD H. ADAMS, a citizen of the United States, and a resident of the city and county of San Francisco, State of California, have invented certain new and useful Improvements in Pedal Attachments, of which the following is a specification.

The invention relates to pedal attachments, and particularly to extension attachments for the pedals of operative levers on motor cars.

The object of the invention is to provide a quickly attachable and removable pedal extension attachment.

Motor cars are frequently driven by several persons of different stature, and the persons of shorter stature have difficulty in reaching the pedals which are attached to the clutch and brake levers. Various expedients have been resorted to by such persons, such as the use of a cushion whereby they are enabled to sit forward in the driver's seat, but these expedients are not generally conducive to ease in riding. Motor car manufacturers have attempted to solve the problem by providing adjustable pedal levers or adjustable seats, but the time and labor required to make these adjustments is a drawback to their general use. It frequently happens that several persons of different stature will drive a motor car in one day, and some quick and easy means should be available for rapidly changing the reach of the pedals. According to my invention, I provide an extension attachment which is readily attached and detached from the pedal, so that the reach thereof is quickly changed.

With this object in view the invention consists of certain novel features of construction, hereinafter fully described, illustrated in the accompanying drawings and particularly pointed out in the appended claims, it being understood that various changes in the form, proportions, size and minor details of construction may be made without departing from the spirit of or sacrificing any of the advantages of the invention.

Figure 1:
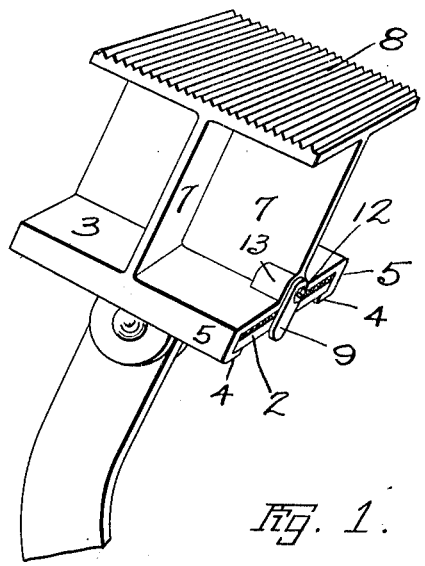
Figure 2:
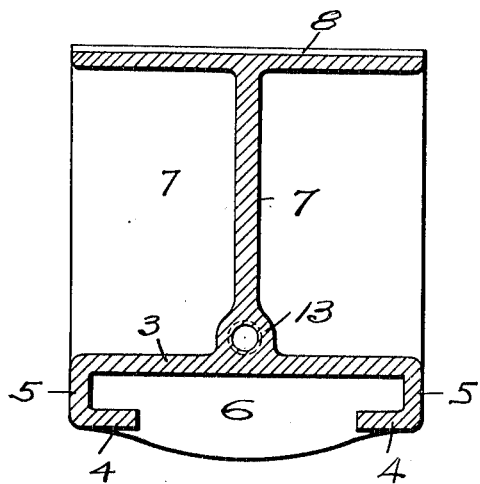

The invention is illustrated in the accompanying drawings, in which,

Figure 1 is a perspective view of the device of my invention attached to a pedal. Fig. 2 is a cross section of the device of my invention taken adjacent one end.

The attachment is preferably made as a casting, having a shape which will fit the particular pedal to which it is to be attached. Motor car pedals are made of different shapes and the present devices are made of the proper shape to fit such pedals. In the present embodiment the pedal 2 is formed rectangular in shape and the device is shaped accordingly.

The device consists of a base portion 3, adapted to rest against the pedal 2, which is provided with inturned flanges 4 arranged on the lower side thereof. The flanges are spaced from the lower face of the base 3 by the walls 5, forming a slot for the receipt of the pedal 2. The forward end of the slot is closed by the depending wall 6. Supported above the base a suitable distance by suitable means, such as the transverse and longitudinal ribs 7, is the foot plate 8, which is preferably serrated or provided with other means for increasing the frictional resistance with the shoe of the operator. The attachment is locked to the pedal by means of the latch 9 which is fulcrumed on the screw 12 which engages in a hole formed in the boss 13, which boss is preferably formed at the juncture of the base and the longitudinal rib.

I claim:

1. A pedal attachment comprising a base, spaced flanges on the under side of said base at the sides, a depending wall at one end of said base, a foot plate arranged above said base, ribs intermediate said plate and base, and a latch adapted to project below said base at the end opposite said depending wall.

2. A pedal attachment comprising an integral casting consisting of a base, spaced flanges formed on the under side of the opposite sides of said base, a depending wall at one end of said base, a foot plate, longitudinal and transverse ribs arranged intermediate said plate and base, a boss formed at the juncture of said base and longitudinal rib, a screw engaging in said boss, and a latch fulcrumed on said screw.

In testimony whereof, I have hereunto set my hand at San Francisco, California, this 23rd day of June 1913.

ARCHIBALD H. ADAMS.

In presence of—
H. G. Frost,
M. Le Conte.